Oct. 4, 1932.  B. A. FISKE  1,881,072
READING MACHINE
Filed July 24, 1930  4 Sheets-Sheet 1
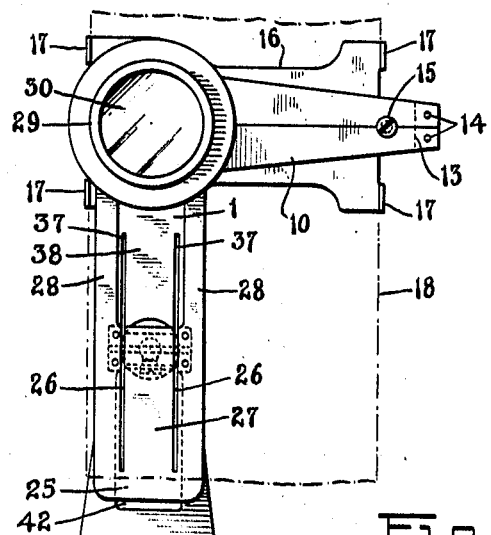
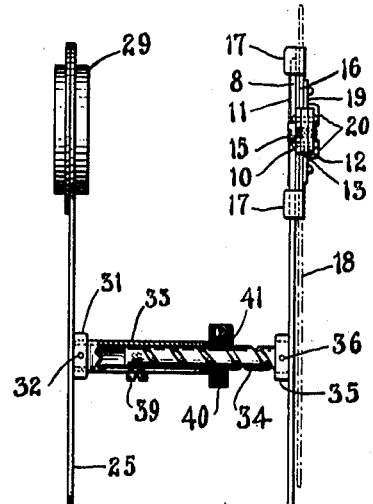
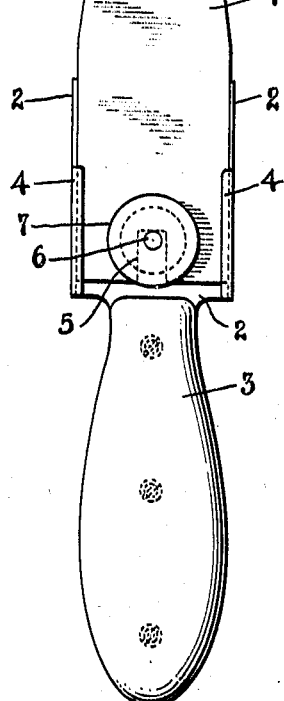
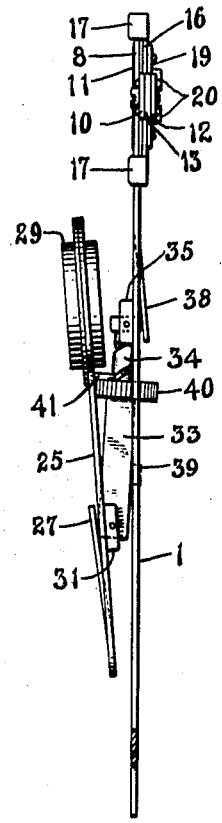
INVENTOR
Bradley A. Fiske
BY
Frank L. Dyer
ATTORNEY Oct. 4, 1932.   B. A. FISKE   1,881,072
READING MACHINE
Filed July 24, 1930   4 Sheets-Sheet 2
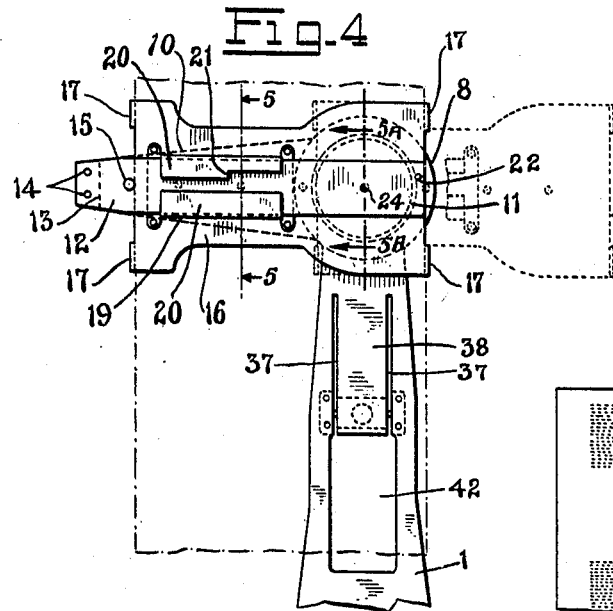
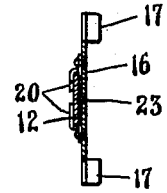
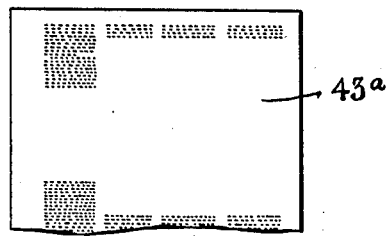
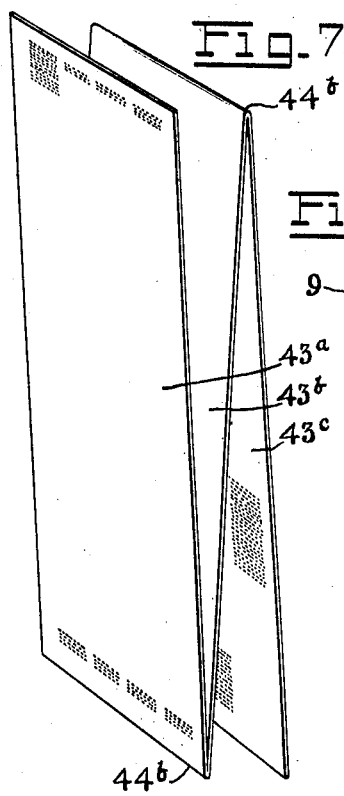
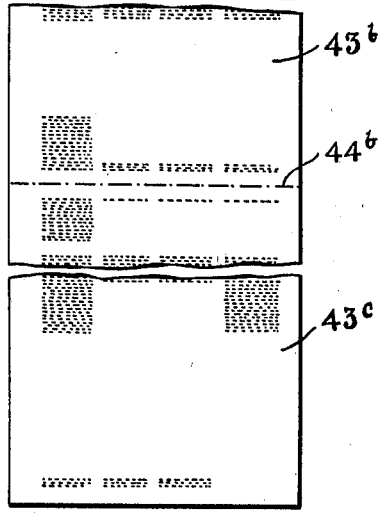
INVENTOR
Bradley A. Fiske
BY
Frank L. Dyer
ATTORNEY Oct. 4, 1932.  B. A. FISKE  1,881,072
READING MACHINE
Filed July 24, 1930   4 Sheets-Sheet 3
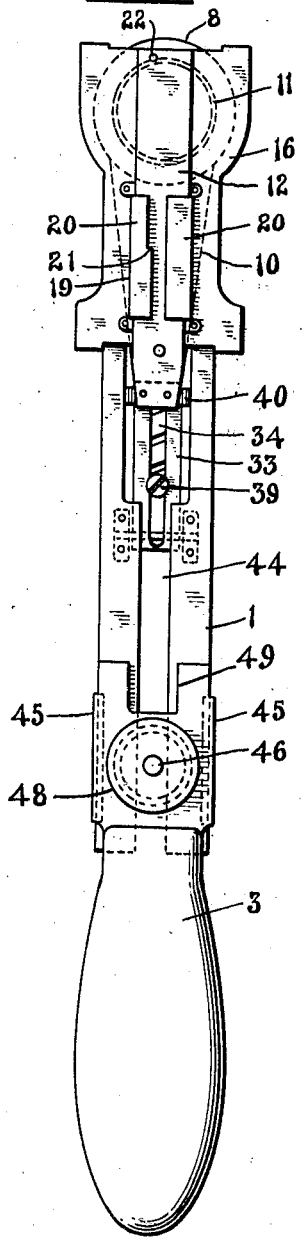
Fig. 8
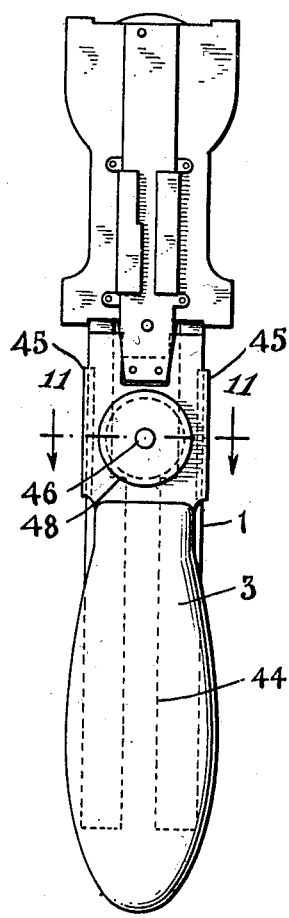
Fig. 9
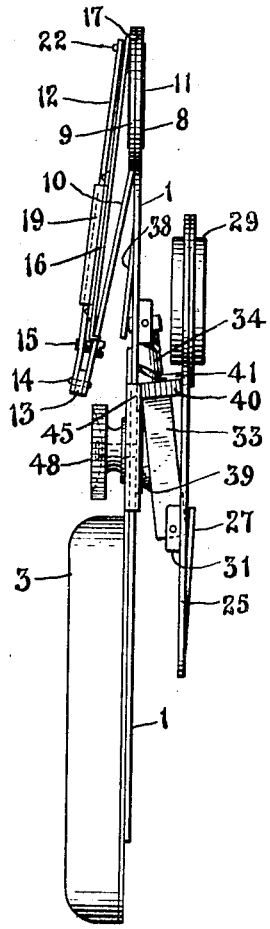
Fig. 10
Fig. 11
INVENTOR
Bradley A. Fiske
BY
Frank L. Dyer
ATTORNEY Oct. 4, 1932.                B. A. FISKE                1,881,072
                            READING MACHINE
                       Filed July 24, 1930          4 Sheets-Sheet 4
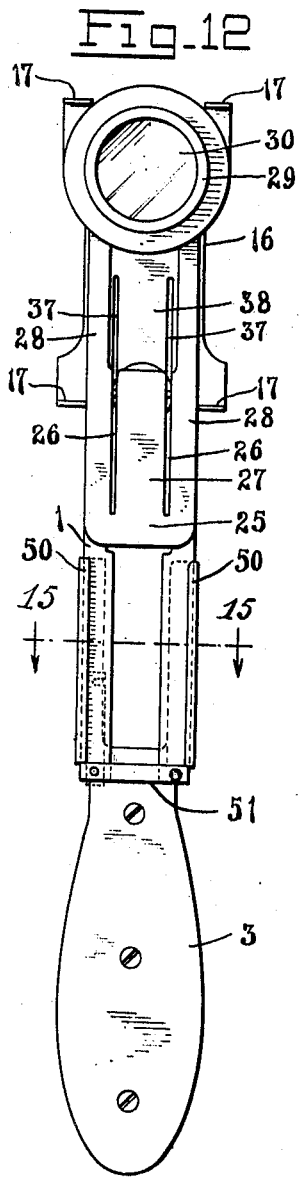
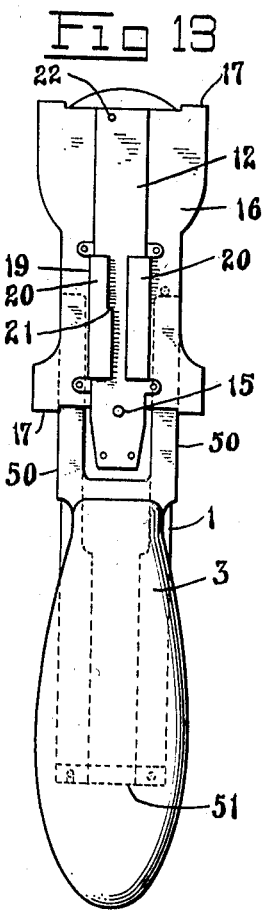
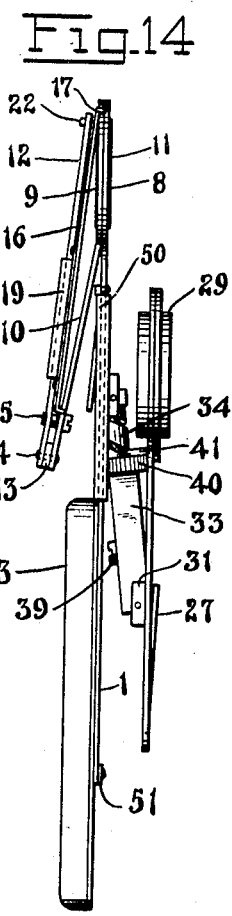
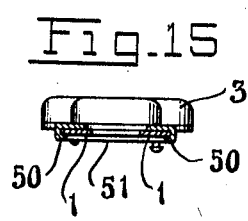
INVENTOR
Bradley A. Fiske
BY
Frank L. Dyer
ATTORNEY Patented Oct. 4, 1932

1,881,072

UNITED STATES PATENT OFFICE

BRADLEY A. FISKE, OF NEW YORK, N. Y.

READING MACHINE

Application filed July 24, 1930. Serial No. 470,384.

My invention relates to various new and useful improvements in reading machines of the type heretofore proposed by me in which a single lens is used and the printed characters of microscopic size are arranged in parallel columns on a card or strip. (See Fiske patent for example, No. 1,568,148 January 5, 1926.)

The objects of my invention are first, to provide a reading machine which will be extremely light; second, to provide a reading machine capable of easy and effective operation with a minimum of fatigue and eyestrain; third, to provide a reading machine in which the card or strip carrying the printed matter in microscopic characters can be conveniently and easily manipulated to bring the successive columns in which the words are arranged accurately in line with the focal axis of the lens; fourth, to provide a reading machine in which the printed columns of microscopic characters can be moved in operation accurately across the field of the lens so as to permit the entire reading matter to be read; fifth, to provide a reading machine in which the focussing of the lens can be effected by simple and sturdy mechanism; sixth, to provide a reading machine in which the card or strip is maintained by friction in a fixed position in the field of the lens and employing adjusting means by which the friction can be regulated to a nicety, and finally, to provide a reading machine capable of being folded flatwise so as to occupy so little space that it may be carried in the vest pocket almost as readily as a fountain pen.

A further object is to provide a new arrangement for the printed matter of the microscopic characters comprising a relatively long strip with the printed characters arranged in a plurality of columns and in a series of three or more panels separated by blank spaces which permit the strip to be folded to occupy the minimum space without interfering in any way or disfiguring the printed matter and without interfering with the reading of the printed matter in operation.

Briefly stated, my improved reading machine comprises a flat and rather narrow support adapted to be held approximately vertically and having a handle at its lower end, said handle being either removable or being adjustable vertically on the support as will be hereinafter explained, when the machine as a whole is folded.

Pivoted to the upper part of the support is an adjustable spring clamp adapted to be moved from a position substantially perpendicular to the support when reading is done to a position substantially parallel to the support when the machine is folded. Carried by this spring clamp is a guide for the paper, so mounted as to permit the printed matter in any one of the columns of the successive panels of the strip to be moved with respect to the lens, always with the center of the column accurately in line with the focal axis, and also permitting the several columns of all the panels to be likewise brought into position with respect to the lens and be similarly guided with respect to the optical axis thereof.

Preferably the pivot or joint between the spring clamp and the support is annular. The line of sight from lens to the printed matter passes through the annulus of such joint.

The device further preferably comprises a lens support carrying the desired lens in line with the annulus just referred to, said lens support having a folding connection with the main support whereby the lens in use will be maintained the desired focal distance from the printed matter, and when folded will be movable to a position substantially parallel with the main support and closely adjacent thereto, so as to occupy the minimum space. Preferably the folding connection between the lens support and the main support will include a simple and effective focussing mechanism by means of which the lens when in use may be adjusted toward or away from the printed matter.

My improved reading machine also comprises various details of construction and arrangement all of which will be more fully hereinafter described and claimed.

In order that the invention may be better understood, attention is directed to the accompanying drawings forming a part of this specification and in which Figure 1 is a front view of one form of my improved reading machine showing the same ready for operation, the paper strip carrying the printed matter in microscopic characters being indicated by a dot and dash line. With this form of the invention the handle is a separate detachable element removable from the main support to save space when the machine is folded.

Figure 2 is a side view of the same device showing the parts in the same position and particularly illustrating the focussing mechanism. Here also the paper strip is indicated by a dot and dash line.

Figure 3 is a side view with the handle removed and with the lens and support thereof in folded position, the spring clamp being shown as in Figure 2.

Figure 4 is a rear view of a portion of Figure 1, principally for the purpose of illustrating the mounting of the pivoted spring clamp and guide plate, the latter being shown in full lines at one extreme position of its adjustment and in dotted lines at the other extreme position of its adjustment.

Figure 5 is a sectional view on the line 5—5 illustrating particularly the mounting of the adjustable guide plate.

Figure 5-A is a section on the line 5-A—5-A of Figure 4 illustrating particularly the annular pivot between the main support and one element of the spring clamp.

Figure 6 is an elevation of the preferred arrangement of paper strip illustrating three panels with the printed matter arranged in four parallel columns on each panel.

Figure 7 is a perspective view showing the strip in folded condition.

Figure 8 is a rear elevation of a modified arrangement employing an adjustable handle adapted to be moved longitudinally with respect to the main support when the parts are to be folded so as to save space. In this figure the spring clamp and guide plate are shown in folded position.

Figure 9 is a view corresponding to Figure 8 the handle being moved with respect to the main support to save space.

Figure 10 is a side view of the same modified form in complete folded condition.

Figure 11 is a section on a line 11—11 of Figure 9 illustrating particularly a convenient locking arrangement for firmly securing the handle in any desired position on the main support.

Figure 12 is a front elevation of a further modification showing a different arrangement for mounting and adjusting the handle, the spring clamp and guide being shown in folded position.

Figure 13 is a rear view of the same form with the handle in its uppermost position to save space.

Figure 14 is a side view of the parts as in Figure 13 in completely folded position, and Figure 15 is a section on the line 15—15 of Figure 12.

In all of the above views corresponding parts are represented by the same reference numerals.

The last arrangement shown in Figures 12 to 15 inclusive I consider to be the preferred form of the invention as it is somewhat lighter than the arrangement illustrated in Figures 8 to 11 inclusive, and occupies substantially no greater space than the arrangement shown in Figure 1 to 5A, inclusive, where the handle is detachable and has to be carried around as a separate element with the danger of possible loss.

For the most part the elements of my improved reading machine are preferably formed of duralumin owing to its lightness and strength. In fact, by using this metal, I have succeeded in making a thoroughly practicable and commercial machine having a removable handle and weighing only three ounces, that is to say, only a fraction of the weight of a standard American magazine.

Referring first to the arrangement shown in Figures 1 to 5A inclusive, it comprises a main support 1, relatively narrow, flat and sufficiently strong for the purpose. With this arrangement a removable handle is used comprising a plate 2 having riveted thereto a handle portion 3 adapted to be grasped easily by the reader. The plate 2 is slightly wider than the main support 1 and is formed with overturned flanges 4 within which the lower portion of the support 1 is received. The support 1 is formed with a recess 5 at the bottom (see dotted lines Figure 1). The plate 2 is provided with a projecting threaded shank 6 which is received in the recess 5 and engaging said shank is knurled nut 7 by means of which the handle may be securely clamped in place or be removable from the support 1 as will be understood.

The upper end of the support 1 is formed as a ring 8 (see Figure 4) and to this rig is pivotally connected a corresponding ring 9 (see Figure 5A) of the element 10 of the spring clamp. The two rings 8 and 9 are connected by an annulus 11 (Figure 5A) formed of a short sleeve, the ends of which are peened around the two rings to form a strong pivoting for the upper clamp, the joint being sufficiently tight as to permit the clamp to be moved with substantial friction so that it will maintain its position in any adjustment.

The element 10 which is thus pivotally mounted with respect to the main support 1 is shown very clearly in Figure 1 and in dotted lines in Figure 4. This element I will hereafter refer to as the clamp support. Secured to the clamp support at its right end is a clamp guide carrier 12 forming the other element of the spring clamp. The guide extends substantially parallel with the clamp support 10, being separated therefrom by a spacer 13 (see Figure 10) and the two elements being held together by rivets 14. (See Figures 1 and 4.) In both of these latter figures the spacer 13 is shown in dotted lines.

As so far described the spring clamp comprises the clamp support 10 pivotally mounted on the main support and provided with a guide 12 spaced a short distance therefrom and extending parallel therewith. Preferably the guide 12 is bent at a slight angle with respect to the main support 1 (see Figure 10) so as to allow a clearance when the parts are folded. The angle shown in Figure 10 is somewhat exaggerated for the purpose of clearness.

In order to regulate the tension of the spring clamp an adjusting screw 15 is employed (see Figures 1 and 10). This adjusting screw also acts as a stop for the guide plate in the extreme position shown in Figure 1. The guide plate 16 is located between the clamp support 10 and the guide 12 as clearly shown in Figure 4. This guide plate is formed with lugs 17 at its corners preferably integral and the space between the lugs, being equal to the width of the paper strip 18, with a slight clearance, whereby the latter will be accurately guided with respect to the lens, to be hereinafter described.

The guide plate 16 is located between the elements 10 and 12 of the clamp and is carried upon the guide 12 so as to be movable thereon from the position shown in full lines in Figure 4 to the position shown in dotted line. Preferably this mounting of the guide plate 16 is effected by means of a plate 19, riveted to the guide plate 16 as shown in Figures 4 and 5 and having flanges 20, 20 embracing the guide 12. One of these flanges is formed with a stop 21 adapted to come into engagement with a pin 22 on the guide 12 when the guide plate is moved to the extreme dotted position shown in Figure 4.

In order that the guide plate 16 may be firmly held in any position of longitudinal adjustment to keep the center of the printed column in line with the focal axis, I form the guide plate 16, with a series of shallow projections 23 adapted to engage frictionally with a shallow recess 24 in the clamp guide 12 (see Figure 5).

There are as many of the projections as there are columns of printed matter on the strip and the relation of the several projections 23 to the recess 24 is such that whenever any one of said projections engages the recess a particular column of printed matter will be brought into alignment with the focal axis and maintained in that position.

In operation, the paper strip 18 will be carried by the guide 16 so that by adjusting said guide longitudinally any particular column of printed matter may be brought into reading position. By reason of the tension between the elements 10 and 12 of the clamp the printed matter will be held snugly in contact with the annulus 11 through which the line of sight projects as explained.

Referring now to the lens and the mounting thereof, I employ a lens support 25 which is slotted at 26—26 to form a spring tongue 27. The support 25 is cut away above this spring tongue so as to form parallel legs 28 (see Figure 1) which latter carry the ring 29 in which the lens 30 is mounted. The lugs 31 are formed on the lens support 25 (see dotted lines Figure 1 and also Figure 2) and between these lugs on a horizontal pivot 32 is mounted a stationary tubular bushing 33. The flat inner end of this bushing is firmly engaged by the upper portion of the tongue 27 so that the parts will normally be held in position shown in Figure 2, but may be moved to the position shown in Figure 3, causing a slight springing of the tongue 27.

Mounted within the tubular bushing 33 is a threaded rod 34, the outer end of which is mounted between lugs 35 on a horizontal axis 36 (see Figure 2). The lens support 1 as shown in Figure 4 is slotted at 37—37 to form a tongue 38, and this latter tongue presses firmly against the end of the threaded member 34 so as to hold it normally in position shown at Figure 2, but adapted to be moved in position shown in Figure 3 so as to spring the tongue 38 slightly.

Engaging the threaded member 34 is a screw 39 the shank of which is movable in a longitudinal slot in the bushing 33. This maintains the lens always in line with the annulus 11, notwithstanding focussing adjustment thereof.

Mounted upon the end of the bushing 33 so as to turn thereon is a knurled thumb nut 40 provided with a finger 41 engaging the threaded rod 34. By turning the thumb nut 40, the finger 41 will travel in the thread and move the lens back and forth so as to secure the desired focal adjustment.

By applying downward pressure on the lens the parts will move from the position of Figure 2 to that of Figure 3, with a sharp click, due to the engagement of the tongues 27 and 38 with the flat ends of the bushing 33 and the threaded member 34 as will be understood.

When in this adjustment, the focussing nut 40 will enter the space 42 below the spring tongue 38, Figure 4, and be more or less straddled by the two lugs 28—28 of the lens support 25.

An important practical advantage of this arrangement is that if the instrument has been in use with the lens at the desired focal adjustment, the thumb nut 40 will remain at the correct position on the threaded rod 34 even after the instrument is folded, with the result that when the lens support is again raised to the reading position, the lens will still be at the correct focal position and the instrument ready for immediate use.

Referring now to Figures 6 and 7, the preferred arrangement of strip is shown for carrying the printed matter. The strip illustrated is formed into three panels 43—A, 43—B, and 43—C, separated by blank spaces permitting the creasing or folding of the strip at the lines 44—A, and 44—B. The printed matter is illustrated on the panels as being arranged in four parallel columns, but obviously the number of panels may be varied as well as the number of columns of printed matter on the panels.

In operation the lens is moved into the position shown in Figure 2 and the spring clamp and guide plate 16 are moved to the position shown in Figure 1. The paper strip is now inserted in the space between the guide 16 and the support 10, the printed matter being observed through the annulus 11. If the guide plate 16 is in the position shown in Figure 1, the lens will be focussed upon the printed matter in the first column.

After the printed matter in the field of the lens has been read, the strip is moved up, say half an inch, so as to present succeeding reading matter, and this operation is continued until the first column on all panels has been read. Thereafter the strip is pulled down and the guide plate 16 is adjusted so as to bring the second column into the field of view of the lens, whereupon the operations above described are repeated.

When it is desired to fold up the apparatus the handle 3 is removed, the lens is snapped down to the position of Figure 3 and the spring clamp is swung down so as to be substantially parallel with the support 1 as shown in Figures 8, 9, 12 and 13.

Referring now to the arrangement shown in Figures 8 to 11 inclusive, it will be understood that the focussing of the lens and the mounting of the spring clamp and the paper guide will be the same as just described. Here the support 1 is formed with a long longitudinal slot 44, the base plate of the handle 3 being provided with overturned lugs 45, very much the same as the lugs 4 in Figure 1. These lugs 45 form a guide, permitting the handle to move up and down on the support 1. A headed screw 46 is provided, the shank 47 of which works in the slot 44, and engaging this shank is a knurled nut 48, whereby the handle may be tightly clamped in position. By releasing the handle it may be moved up to position shown in Figures 9 and 10, the handle being cut away at 49 so as to clear the focussing nut 40.

It will be observed that with this arrangement the lower end of the handle can be moved upwards almost to the bottom line of the support 1 (see Figure 9) so that the device is practically as compact as the arrangement of Figure 1, with the advantage, however, that the handle is really a part of the reading machine and not a separate detachable element. However, it will be seen that the handle may be entirely removed if desired.

With the arrangement of Figures 12 to 15 inclusive, the locking screw 48 is dispensed with. Here, the base plate of the handle is provided with flanges 50 which grip upon the main support 1 with sufficient friction to hold the handle rigidly in any position. With this arrangement a small latch 51 is employed at the bottom of the support 1 to prevent the handle normally from coming off, but this latch may be moved to the position shown in dotted lines, Figure 12, so as to permit the handle to be removed.

Having now described my invention, what I claim as new therein is as follows:

1. In a reading machine, the combination with a main support and means thereon for carrying the printed matter in the form of a card or strip, of a lens support and lens, connections between the lens support and main support permitting the movement of the lens support from a reading position parallel to the main support and spaced therefrom to a folded position adjacent the main support and resilient means for holding the lens in both its reading position and its folded position.

2. In a reading machine the combination with a main support and means thereon for carrying the printed matter in the form of a card or strip, of a lens support and lens, a focussing or telescopic connection between the lens support and main support permitting the movement of the lens support from a reading position parallel to the main support and spaced therefrom to a folded position adjacent the main support and resilient means for holding the lens in both its reading position and its folded position.

3. In a reading machine, the combination with the main support and means thereon for carrying the printed matter in the form of a card or strip, of a lens support and lens, a hollow bushing pivoted to one of the supports, a threaded rod engaging said bushing and pivoted to the other support, and resilient tongues for engaging the ends of said bushing and said rod to hold the lens in operative relation to the reading matter and also to hold the lens support in folded relation to the main support.

4. The combination with a main support and a lens carried thereby, of a spring clamp pivoted to the main support for carrying the reading matter in the form of a card or strip, said clamp being movable from a reading position substantially at right angles to the main support into a folded position substantially in line with the main support.

5. In a reading machine, the combination with a main support and a lens carried thereby, of a spring clamp secured to said support, and a paper guide for receiving the printed matter in the form of a card or strip and adjustably mounted on said spring clamp, said guide being adjustable to desired positions with respect to the spring clamp.

6. In a reading machine, the combination with a main support and a lens carried thereby, of a spring clamp, an annulus or ring by which the clamp is pivotally mounted on said support and a paper guide carried by the spring clamp and in line with said annulus, whereby the printed matter will be observed through said annulus or ring.

7. In a reading machine, the combination with a main support and a lens carried thereby, of a spring clamp, an annulus or ring by which the clamp is pivotally mounted on said support and a paper guide carried by the clamp and in line with said annulus, whereby the printed matter will be observed through said annulus or ring, said guide being adjustable longitudinally with respect to said clamp.

8. In a reading machine, the combination with a main support and a lens carried thereby, of a spring clamp, an annulus or ring by which the clamp is pivotally mounted on said support and a paper guide carried by the clamp and in line with said annulus, whereby the printed matter will be observed through said annulus or ring, and means for regulating the pressure imposed upon the card or strip in said guide.

9. In a reading machine the combination of a main support, a spring clamp pivoted to said support and movable from a reading position at right angles to the main support to a folded position substantially in line with said support, a lens support and lens and a connection between the lens support and main support permitting the lens to be moved from a reading position parallel to the main support but spaced therefrom into a folded position adjacent the main support.

10. In a reading machine the combination of a main support, a spring clamp pivoted to said support and movable to a folded position and substantially in line with said support, a lens support and lens and a connection between the lens support and main support permitting the lens to be moved from a reading position parallel to the main support but spaced therefrom into a folded position adjacent the main support, and resilient means for holding the lens support in both its folded and reading position.

11. In a reading machine, the combination with a main support and a lens carried thereby, of a spring clamp pivoted to said support and movable to a folded position thereon, and a paper guide for receiving the printed matter in the form of a card or strip and adjustably mounted on said spring clamp, said guide being adjustable to desired positions with respect to the spring clamp.

BRADLEY A. FISKE.